United States Patent

McCullough

[11] 4,121,438
[45] Oct. 24, 1978

[54] COUPLING MEMBER FOR ORBITING MACHINERY

[75] Inventor: John E. McCullough, Carlisle, Mass.

[73] Assignee: Arthur D. Little, Inc., Cambridge, Mass.

[21] Appl. No.: 722,713

[22] Filed: Sep. 13, 1976

[51] Int. Cl.$^2$ ............................................. F16D 3/04
[52] U.S. Cl. ......................................... 64/31; 64/9 R
[58] Field of Search ................... 418/55; 64/9 R, 31

[56] References Cited

U.S. PATENT DOCUMENTS

| | | | |
|---|---|---|---|
| 1,862,220 | 6/1932 | Johnson | 64/31 |
| 1,907,447 | 3/1930 | Schiltz | 64/31 |
| 2,447,424 | 8/1948 | Nightingale | 64/31 UX |
| 3,088,763 | 5/1963 | Foltz | 64/31 |
| 3,606,768 | 11/1969 | Wildhaber | 64/31 |
| 3,664,153 | 5/1972 | Sugahara | 64/31 |
| 3,698,208 | 10/1972 | Williams | 64/31 |
| 3,884,599 | 5/1975 | Young | 418/55 |
| 3,924,977 | 12/1975 | McCullough | 418/55 |

FOREIGN PATENT DOCUMENTS 1,154,680  9/1963  Fed. Rep. of Germany ............. 64/31

Primary Examiner—Benjamin W. Wyche
Assistant Examiner—R. C. Turner
Attorney, Agent, or Firm—Bessie A. Lepper

[57] ABSTRACT

A coupling member particularly suited for coupling two components in a predetermined angular relationship while one component is orbited relative to the other. The coupling member comprises a ring having pairs of oppositely disposed keys on opposite annular surfaces, one pair of keys being displaced 90° from the other. The keys are held on pivot pins affixed to the ring, the pivot pins preferably having flanges which are set in counterbores in the ring. A plurality of axial force-stabilizing disks are also inset on the annular ring surfaces.

5 Claims, 4 Drawing Figures

COUPLING MEMBER FOR ORBITING MACHINERY

This invention relates to a coupling member and more particularly to a coupling member for orbiting machinery in which two components must be maintained in a predetermined angular relationship while one component is orbited with respect to the other component. The coupling member of this invention is particularly suited for coupling the orbiting and stationary scroll members of so-called scroll-type machinery.

There is known in the art a class of devices generally referred to as "scroll" pumps, compressors and engines wherein two interfitting spiroidal or involute spiral elements of like pitch are mounted on separate end plates to form an orbiting and a stationary scroll member. The spiral elements of the scroll members are angularly and radially offset to contact one another along at least one pair of line contacts such as between spiral curved surfaces. A pair of line contacts will lie approximately upon one radius drawn outwardly from the central region of the scrolls. The fluid volume so formed therefore extends all the way around the central region of the scrolls. In certain special cases the pocket or fluid volume will not extend the full 360° but because of special porting arrangements will subtend a smaller angle about the central region of the scrolls. The pockets define fluid volumes, the angular position of which varies with relative orbiting of the spiral centers; and all pockets maintain the same relative angular position by virtue of the fact that the scroll members are coupled through a coupling member to maintain them in a predetermined angular relationship. As the contact lines shift along the scroll surfaces, the pockets thus formed experience a change in volume. The resulting zones of lowest and highest pressures are connected to fluid ports.

The nature and role of the coupling member require that it make rubbing contact with the orbiting scroll member and with the stationary scroll member or with another stationary component such as the housing or a thrust bearing. This in turn means that the coupling member is subjected to conditions which may lead to wear; and that in some cases these conditions are such as to require a coupling member capable of extended periods of operation without maintenance or replacement. Illustrative of such conditions which require coupling members resistive to undue wear over long period of operation are those which obtain in a refrigeration compressor, e.g., a compressor for a household refrigerator. Such a scroll-type compressor is described in detail in co-pending application Ser. No. 722,695 filed concurrently herewith and now U.S. Pat. No. 4,065,279.

It is therefore a primary object of this invention to provide an improved coupling member for apparatus incorporating components which must be maintained in a predetermined angular relationship while one component is orbited relative to another. It is a further object to provide a coupling member of the character described which is particularly suitable for coupling an orbiting scroll member to a stationary scroll member, either directly or indirectly through another fixed component. An additional object is to provide a coupling member which is capable of operating over extended periods of time without experiencing undue wear. Yet a further object is to provide such a coupling member which is designed to be oil lubricated in a manner to attain the most efficient use of the lubricant. Other objects of the invention will in part be obvious and will in part be apparent hereinafter.

According to this invention, there is provided a coupling member comprising, in combination, a ring with first and second opposed annular surfaces, a first pair of oppositely disposed pivot pins attached to the first surface, a second pair of oppositely disposed pivot pins attached to the second surface and displaced 90° from the first pair of pivot pins, four keys in the form of rectangular blocks, each key having a central hole sized to make a sliding fit over one of the pivot pins and spaced oil grooves in its larger lateral faces oriented parallel to the axis of the central hole, and a plurality of axial force-stabilizing disks set in the first and second opposed surfaces. The annular ring is preferably formed of a light-weight alloy and the keys and force-stabilizing disks of a self-lubricating material. In a preferred embodiment of the coupling member, each of the pivot pins is flanged and the flanged section is inset in a counterbore in the annular ring. In a similar fashion, the disks are inset in counterbores in the annular ring.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in conjunction with the accompanied drawings in which FIG. 1 is a top plan view of the coupling member of this invention;

Figure 1:
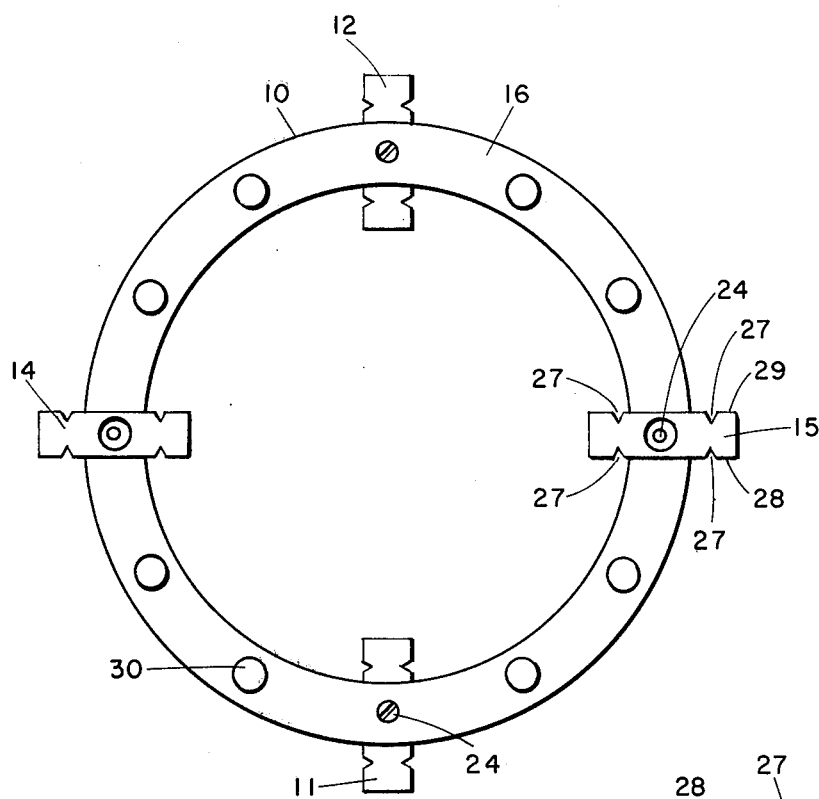

FIGS. 1–4, in which the same reference numerals are used to refer to the same apparatus components, illustrate the coupling means of this invention. As will be shown in FIG. 1, the coupling member comprises a ring 10, which may be formed of a relatively light weight alloy, with a first pair of two key blocks 11 and 12 oppositely disposed on one annular surface 13 of ring 10 and suitable for slidingly engaging keyways of the same general configuration in the coupling surface of one of the components, e.g., an orbiting scroll member, to be coupled. A second pair of two key blocks 14 and 15 are oppositely disposed on the other opposite annular surface 16 of ring 10 and are suitable for slidingly engaging keyways of the same general configuration in the coupling surface of the other of the components to be coupled, e.g., a stationary scroll member, or housing or bearing to which the stationary scroll member is rigidly affixed. Keys 11 and 12 are displaced 90° from keys 14 and 15.

Each of the key blocks is formed of a self-lubricating material such as a polyimide or a polytetrafluoroethylene, and each is affixed to annular ring 10 through a pivot pin 20 formed, for example, of a hardened steel. As will be seen in FIG. 2, which illustrates the manner in which the key blocks are assembled on ring 10, each key block (using key block 15 as exemplary) has a central hole 21 sized to make a sliding fit over pivot pin 20. In assembling the apparatus in which the coupling member is incorporated, the key blocks are slipped over their pivot pins and aligned when they are located in the keyways in which they are to slide during operation. The key blocks are seated in the keyways in a manner not to require any actual attachment means between the key blocks and their pivot pins.

Figure 3:
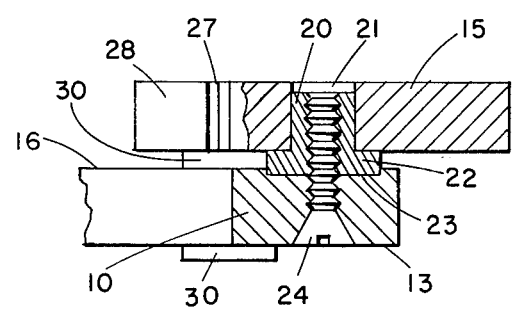
FIG. 3 is a detailed cross section of a portion of the coupling member showing the construction and attachment of a coupling key.
Figure 2:
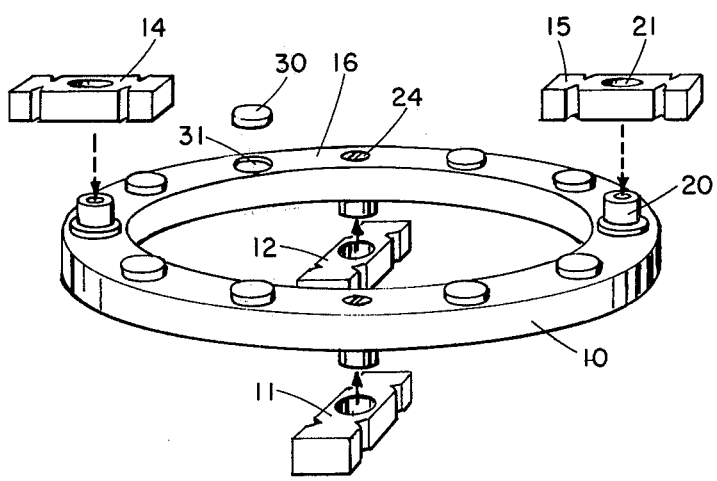
FIG. 2 is a perspective view of the coupling member showing the manner of location and placing the coupling keys.
Figure 4:
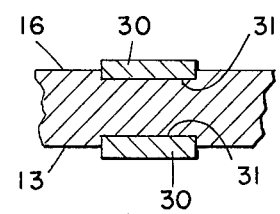
FIG. 4 is a detailed cross section through the coupling ring showing the inset of the axial force-stabilizing disks.

As will be seen in the fragmentary cross sectional detail of FIG. 3, each pivot pin 20 has a flange 22 which is inset into a counterbore 23 in the surface of annular ring 10, and it is affixed to ring 10 through screw 24. The use of the flange 22 reduces contact stresses, and the insetting of pivot pin 20 into ring 10 results in the carrying of the load into the coupling ring rather than into the screw.

Each key is configured as a rectangular block having larger and smaller lateral faces and it has two parallel spaced oil grooves 27 cut in the two larger lateral faces 28 and 29 and running parallel to the axis of central passage 21. The distance between the two grooves in any one key face should be less than twice the orbit radius of the orbiting component it is used to couple. It is preferable that the spacing is at least equal to the orbit radius. The locations and spacings of these lateral oil grooves furnish the channels necessary to provide an effective and efficient oil film around the key block so that their contracting surfaces (larger faces, top and bottom) are protected from wear.

Finally, both sides of the annular ring have a plurality of spaced axial force-stabilizing disks 30 formed of a self-lubricating material and set in counterbores 31 in the ring surfaces 13 and 16. When the apparatus, e.g., a scroll compressor, in which the coupling member is used is operating, the coupling is under torque loading and secondary moments result in axial forces on the coupling. The purpose of the disks 30 is to carry these secondary forces. Thus, the disks 30 serve to stabilize the annular ring 10 of the coupling member.

The coupling member of this invention has been found to experience no undue wear over extended periods of operation in a scroll compressor such as described in Ser. No. 722,695. This coupling member may also be used in the apparatus of U.S. Pat. No. 3,924,977 and of Ser. Nos. 561,478, 561,479 and 570,170 all of which are assigned to the same assignee as the present application.

It will thus be seen that the objects set forth above, among those made apparent from the preceding description are efficiently attained and, since certain changes may be made in the above construction without departing from the scope of the invention, it is intended that all matter contained in the above description or shown in the accompanying drawings shall be interpreted as illustrative and not in a limiting sense.

I claim:

1. A coupling member suitable for coupling two components in angular relationship as one of said components is orbited with respect to the other, comprising in combination
    (a) a ring with first and second opposed annular surfaces;
    (b) a first pair of oppositely disposed pivot pins attached to said first surface;
    (c) a second pair of oppositely disposed pivot pins attached to said second surface and displaced 90° from said first pair of pivot pins;
    (d) four keys in the form of rectangular blocks, each of said keys having (1) a central hole sized to make a sliding fit over one of said pivot pins whereby each of said keys is alignable with respect to a keyway in one of said components, and (2) spaced oil grooves in its larger lateral faces oriented parallel to the axis of said central hole; and
    (e) a plurality of axial force-stabilizing disks set in said first and second opposed annular surfaces.

2. A coupling member in accordance with claim 1 wherein said ring is formed of a light-weight alloy, said keys and disks are formed of a self-lubricating material and said pivot pins are formed of hardened steel.

3. A coupling member in accordance with claim 2 wherein said self-lubricating material is a polyimide.

4. A coupling member in accordance with claim 1 wherein each of said pivot pins terminates in a flange and said flange is set in a counterbore in said ring and said pivot pin is attached to said ring through a screw.

5. A coupling member in accordance with claim 1 suitable for coupling two components, one component of which is orbited with respect to the other, and wherein the spacing between said oil grooves in said larger lateral faces is at least equal to the orbit radius of said one component but less than twice said orbit radius.

* * * * *